United States Patent [19]
Girod et al.

[11] Patent Number: 5,809,139
[45] Date of Patent: Sep. 15, 1998

[54] WATERMARKING METHOD AND APPARATUS FOR COMPRESSED DIGITAL VIDEO

[75] Inventors: Bernd Girod, Spardorf; Frank H. D. Hartung, Erlangen, both of Germany

[73] Assignee: Vivo Software, Inc., Waltham, Mass.

[21] Appl. No.: 710,246

[22] Filed: Sep. 13, 1996

[51] Int. Cl.[6] .................................................. H04N 7/167
[52] U.S. Cl. .................................. 380/5; 380/20; 380/49; 380/23
[58] Field of Search .................... 380/5, 20, 49, 380/23; 355/201; 382/232

[56] References Cited

U.S. PATENT DOCUMENTS

| | | | |
|---|---|---|---|
| 5,321,470 | 6/1994 | Hasuo et al. | 380/3 |
| 5,434,649 | 7/1995 | Hasuo et al. | 355/201 |
| 5,583,614 | 12/1996 | Hasuo et al. | 380/3 |
| 5,613,004 | 3/1997 | Cooperman et al. | 380/28 |
| 5,636,292 | 6/1997 | Rhoads | 382/232 |
| 5,687,236 | 11/1997 | Moskowitz et al. | 380/28 |

OTHER PUBLICATIONS

E. Koch et al., *Towards Robust and Hidden Image Copyright Labeling*, Proc. of 1995 IEEE Workshop on Nonlinear Signal and Image Processing, pp. 1–4, Jun. 20–22, 1995.

J.J.K. O Ruanaidh et al., *Watermarking digital images for copyright protection*, IEE Proc–Vis. Image Signal Process, vol. 143, No. 4, pp. 250–256, Aug. 1996.

Ingemar J. Cox et al., *Secure Spread Spectrum Watermarking for Multimedia*, NEC Research Institute, Technical Report 95–10, pp. 1–33, Dec. 4, 1995.

*Primary Examiner*—David C. Cain
*Attorney, Agent, or Firm*—Kudirka & Jobse, LLP

[57] ABSTRACT

A digital watermarking method and apparatus allows for the watermarking of a digital video signal in a compressed form, thereby allowing watermarking of a pre-compressed video sequence without requiring the decoding and re-coding of the signal. The watermark signal is a sequence of information bits which has been modulated by a pseudo-random noise sequence to spread it in the frequency domain. The video signal is transform coded, preferably with a discrete cosine transform, and a watermark signal, which has been transform coded using the same type of transform, is added to the coded video signal. The system also includes bitstream control to prevent an increase in the bit rate of the video signal. This allows the system to be used with transmission channels having strict bit rate constraints. For each transform coefficient of the video signal, the number of bits necessary to encode the watermarked coefficient is compared to the number of bits necessary to encode the unwatermarked coefficient. If more bits are required to transmit a watermarked coefficient than to transmit the corresponding unwatermarked coefficient, the watermarked coefficient is not output, and the unwatermarked coefficient is output in its place. When watermarking interframe coded data, a drift compensation signal may be used to compensate for the accumulating variations in the decoded video signal stored at the receiver. The system may also include an encryption/decryption capability, with the watermarking apparatus located at either the transmitting or receiving end of the transmission channel.

36 Claims, 8 Drawing Sheets

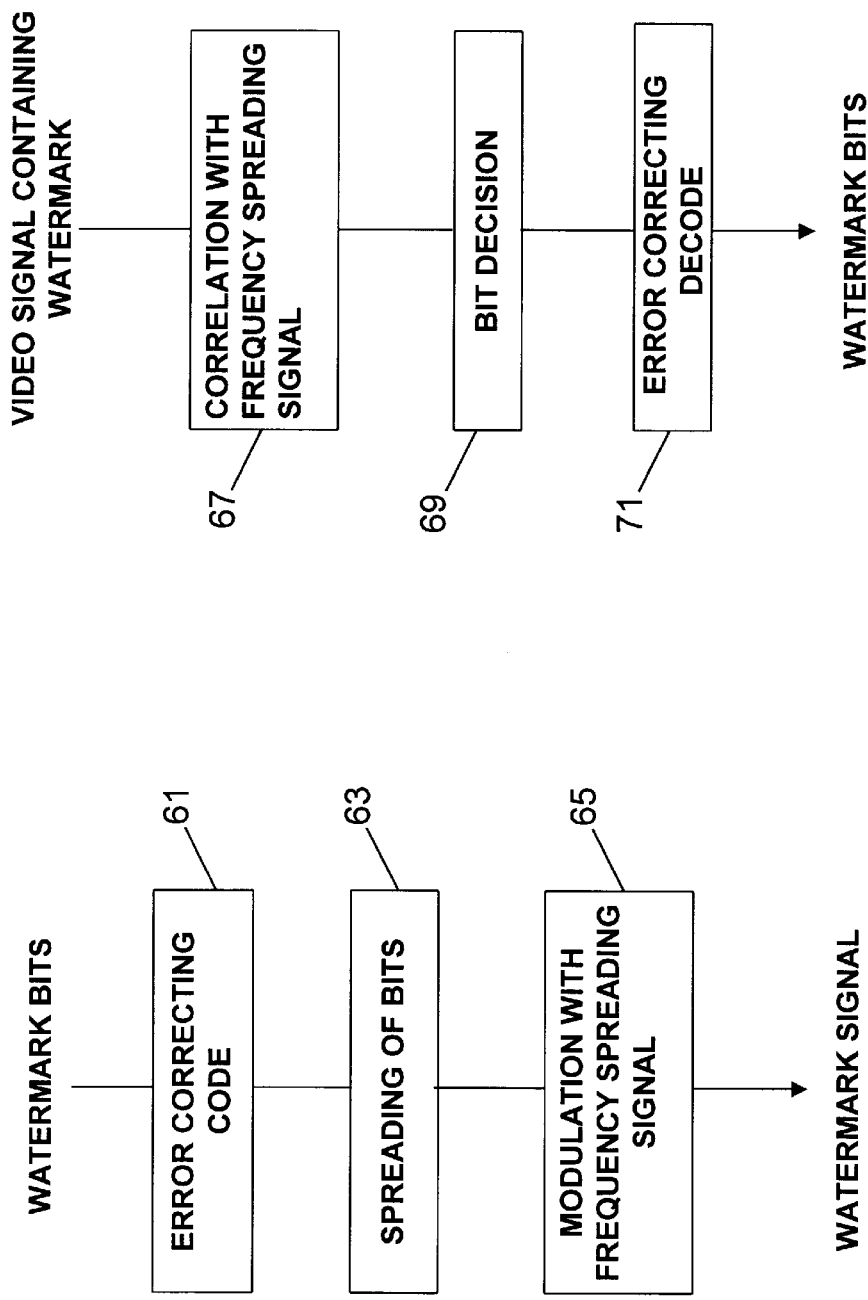

WATERMARKING METHOD AND APPARATUS FOR COMPRESSED DIGITAL VIDEO

BACKGROUND OF THE INVENTION

1. Field of the Invention

The present invention relates to the watermarking of digital images and, in particular, to the watermarking of compressed digital video signals.

2. Description of the Related Art

With the advent of digital video and digital video broadcasting, issues of copyright protection have become more important, since the duplication of digital video does not result in the inherent decrease in quality suffered by analog video. One method of copyright protection is the addition of a "watermark" to the video signal. The watermark is a digital code embedded in the bitstream of the digital video which typically indicates the copyright owner. The watermark, if applied to individual copies of the video, may also be used to indicate the identity of the receiver of each copy. This allows illegally reproduced copies to be traced back to the receiver from which they originated.

For watermarking of digital video, a number of different characteristics of the watermark are desirable. First, the watermark should be embedded in such a way that it is imperceptible or barely perceptible to a viewer of the video. Secondly, the watermark should be such that it can not be removed by intentional or unintentional operations on the digital video bitstream or on the decoded video without, at the same time, degrading the perceived quality of the video to the point of significantly reducing its commercial value (a characteristic referred to as "robustness"). Thirdly, since the video may be stored for broadcast in a compressed form (such as in a "video-on-demand" server), it is desirable to be able to incorporate the watermark into the bitstream without having to decode the signal first and to re-encode it after adding the watermark. This has been done with the watermarking of digital still images, but the method used does not lend itself to digital video, due to the additional constraints which video signals present.

Many digital video applications are "constant bit rate" applications, which do not tolerate increases in the bit rate of the transmitted bitstream. Even in those applications which are not restricted to a constant bit rate, unnecessary increases in the bit rate should be avoided, so as to preserve the real-time decodability of the video signal when transmitted over a channel having a given bandwidth. Thus, it is desirable that the addition of the watermark does not increase the bit rate of the video signal.

Past watermarking techniques for digital video are limited to the watermarking of uncompressed video data. However, since video sequences are often stored in a compressed format (thereby saving on memory space), watermarking the signal in a way which uniquely identifies each receiver of the signal would require decoding of the signal, addition of the watermark, and recoding before the signal is transmitted. This clearly places a significant time and processing burden on the task of delivering the video sequence.

SUMMARY OF THE INVENTION

The present invention provides a method and apparatus for watermarking a compressed digital video bitstream. The watermark data sequence is spread by repeating individual bits, and is then modulated by a frequency spreading signal, preferably a pseudo-random noise signal. The watermark signal is then transform coded in the same manner that the video signal has been transform coded, preferably using a discrete cosine transform (DCT). The result is that, for each block of video data, the watermark signal and the video signal include a plurality of transform coefficients. Coefficients of the watermark signal are then added to coefficients of the video signal to produce a compressed, watermarked digital video signal.

In a preferred embodiment, the video signal is coded using an MPEG-2 compatible hybrid coder. After DCT coding, the video signal is quantized and then reconstructed in a motion compensation feedback loop. The motion compensated, delayed signal is combined with the input video signal to the coder to produce the desired interframe coded prediction errors. The prediction error signal is also preferably entropy coded, in the preferred embodiment using a run-level encoder.

Prior to watermarking, the DCT coefficients of the video signal are entropy decoded and dequantized. The coefficients are then summed with DCT coefficients of the watermark signal. The watermarked video signal is thereafter quantized, entropy coded and output to the intended recipient. In a preferred embodiment, a drift compensation signal is added to the watermarked video signal to remove the effect on the video signal of a watermark from a previous frame. The drift compensation signal is generated by taking the input and output signals to the watermarking apparatus, entropy decoding, dequantizing, and inverse transforming each of them, motion compensating each of them, and subtracting the output signal from the input signal to acquire a difference signal. This difference signal is then transform coded, and partially or fully added to the watermarked DCT coefficients of the video signal.

In order to be compatible with transmission networks having bit rate constraints (i.e. which do not allow for an increase in the bit rate of the video signal) the watermark is applied in such a way as to prevent a bit rate increase. In the preferred embodiment of the invention, a bitstream controller is used to compare the total number of bits used to encode each coefficient of the unwatermarked signal to the total number of bits used to encode the corresponding coefficient of the watermarked signal. If the number of bits used to encode a coefficient of the watermarked signal is equal to, or less than, the number of bits used to encode the corresponding coefficient of the unwatermarked signal (plus a possible budget of bits originating from previously saved bits), the coefficient of the watermarked signal is output. If the number of bits used to encode a coefficient of the watermarked signal is not equal to, or less than, the number of bits used to encode the corresponding coefficient of the unwatermarked signal (plus a possible budget of bits originating from previously saved bits), the coefficient of the unwatermarked signal is output.

The watermark signal in the present invention is a sequence of information bits which is modulated by a frequency spreading signal, preferably a pseudo-random noise signal. Prior to this modulation, the sequence may be spread by a chip rate cr. The modulated signal may also be multiplied by an amplitude factor $\alpha$. The watermark signal is then transform coded using the same type of transform used for the video signal preferably a DCT), after which it is partially or fully added to the transform-coded video signal. To later detect the watermark sequence, the watermarked video signal is multiplied by the same frequency spreading signal used to modulate the watermark. A correction term may also be added to account for an uneven distribution of high and low digits in the frequency spreading signal.

In one alternative embodiment of the invention, an encryption system is used in conjunction with the watermarking device, such that the signal is watermarked and encrypted prior to being transmitted to the receiver. At the receiving end, the signal is then decrypted and decoded. In a variation of this embodiment, the watermarking apparatus is combined with the decryption apparatus. The video signal is encrypted prior to transmission, but not watermarked until it is received. Once the signal is received and decrypted, a watermark is applied. The system can be configured such that the watermarking/decryption apparatus does not decrypt the signal without also applying a watermark. In this way, circumvention of the watermarking process is avoided. After decrypting and watermarking, the signal is decoded and the watermark may be detected if needed.

BRIEF DESCRIPTION OF THE DRAWINGS

FIG. 2B is a flowchart showing the steps for generating a watermark in accordance with the present invention.

FIG. 2C is a flowchart showing the steps for retrieving a watermark in accordance with the present invention.

DETAILED DESCRIPTION OF THE PREFERRED EMBODIMENTS

Figure 1:
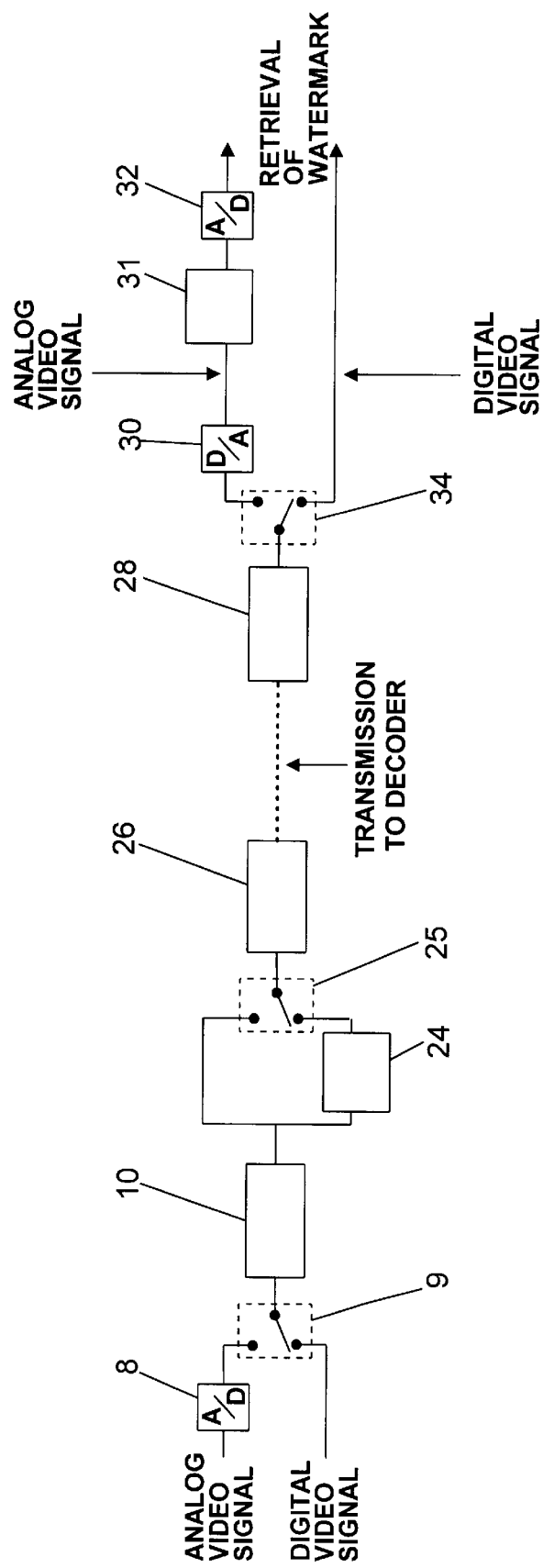
FIG. 1 is a schematic overview of a digital video transmission system having digital watermarking according to the present invention.

Shown in FIG. 1 is a block diagram of a digital video coding and watermarking system according to the present invention. The input to the system is either a digital video signal or an analog video signal which is digitized (i.e. sampled) using analog-to-digital (A/D) converter 8 to create a digital video signal. The option to use either a digital or an analog signal is demonstrated by selector 9, which is depicted in FIG. 1 using the schematic symbol for an electrical switch. The digital video signal (either original or converted using A/D converter 8) is then input to a video coder 10, which is one of a number of different known digital video compression coders. In the preferred embodiment, the coder 10 is a hybrid coder which conforms to the MPEG-2 standard put forth by the ISO as standard ISO/IEC 13818-2. Such a coder is shown schematically in FIG. 1A.

Figure 1A:
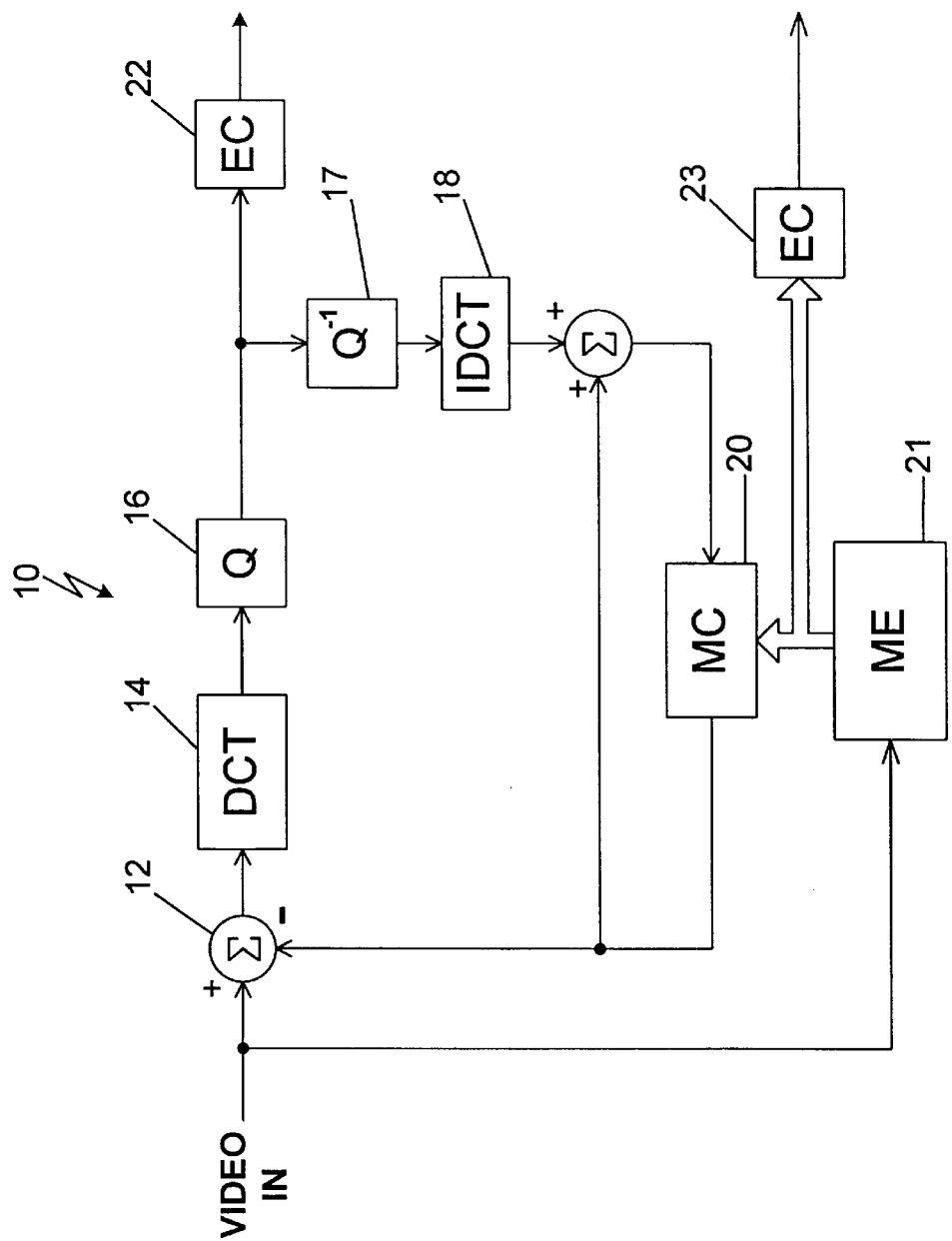
FIG. 1A is a schematic diagram of an interframe coder which may be used with the present invention.

The coder of FIG. 1A receives the input video signal at summing node 12. The output of summing node 12 is a subtraction from a current frame of the input signal, of a motion-compensated version of a previous frame of the input signal. This allows for the generation of an interframe coded prediction error signal. However, it is noted that intraframe coding may also be accomplished using the coder of FIG. 1A, if the output of the motion compensator is set to zero. Thus, while much of the description herein refers to interframe coded signals and "prediction error" signals, those skilled in the art will recognize that the present invention applies to video sequences which are interframe coded, those which are intraframe coded, and sequences which make use of both interframe and intraframe coded frames, or areas of frames.

The output of summing node 12 is received by discrete cosine transform element (DCT) 14. The DCT 14 is a hardware, software, or hybrid hardware/software component that performs a discrete cosine transform on the data received from the summing node 12, in a manner well-known in the art. The result is the transform to a set of coefficients which are then input to quantizer 16. The quantizer 16 assigns one of a plurality of discrete values to each of the received coefficients.

The output of quantizer 16 is received by an an inverse quantizer 17 which maps the quantizer index into a quantizer representative level, and inverse discrete cosine transform element (hereinafter "inverse DCT") 18. The inverse DCT 18 performs an inverse discrete cosine transform on the data received from inverse quantizer 17, in a manner well-known in the art. The decoded signal from inverse DCT 18 is processed using some form of motion compensation means (hereinafter "motion compensator") 20. Motion compensator 20 provides motion compensation to the reconstructed image passed to summing node 12. Provided in association with the motion compensator 20 is motion estimator 21, which makes motion estimations based on the original input video signal, and passes the estimated motion vectors to both motion compensator 20 and entropy coder EC 23.

At summing node 12 (when operating in interframe mode), a frame-to-frame difference is calculated, such that the output of summing node 12 is only pixel changes from one frame to the next. Thus, the data which is compressed by DCT 14, quantizer 16 and EC 22 is only the interframe prediction error representing changes in the image from frame to frame. This compressed signal may then be transmitted over a network or other transmission media, or stored in its compressed form for later recall and decompression. Prior to transmission or storage, the interframe coded signal is also typically coded using entropy coder 22 (also known in the art as a variable length coder). The entropy coder 22 provides still further compression of the video data by mapping the symbols output by the quantizer to variable length codes based on the probability of their occurrence.

In the preferred embodiment, the entropy coder 22 is a "run-level" encoder. Run-level encoders are known in the art, and convert the data to codes each indicative of the length of a string of zero coefficients, and the value of a non-zero coefficient which immediately follows the string. The signal output from entropy coder 22 is transmitted along with the compressed motion vectors output from entropy coder 23, which performs compression on the motion vector data.

Referring again to FIG. 1, the output of the interframe coder 10 is input to either digital watermarking apparatus 26 or data storage device 24. Data storage device 24 is a device such as a video-on-demand server, in which is stored a pre-compressed video signal, such as that generated by source coder 10. The digital watermarking device 26 is shown as being able to receive data from either the coder 10 directly, or from the data storage device 24. The ability to receive the data from either of these two sources is represented by selector 25, which is depicted using the schematic symbol for an electrical switch.

Once the signal is watermarked, it is transmitted to the receiver in question. The received signal can then be decoded at the destination site using interframe video decoder 28. The decoder 28 performs the inverse functions of the coder 10, in a manner well understood in the art. The watermark, having been embedded in the digital signal, can be recovered later in a manner described below. The present invention provides a method of watermarking (described in more detail hereinafter) which is very robust, so much so that the signal can be converted to an analog signal and back to a digital signal, without the watermark being lost. Moreover, the analog video signal might be transmitted by analog transmission methods or stored on a conventional video tape recorder without losing the embedded watermark signal (this capability being represented by analog storage or transmission element 31). Selector 34 is used to demonstrate that the watermark can be recovered with or without conversion to an analog state.

Figure 2:
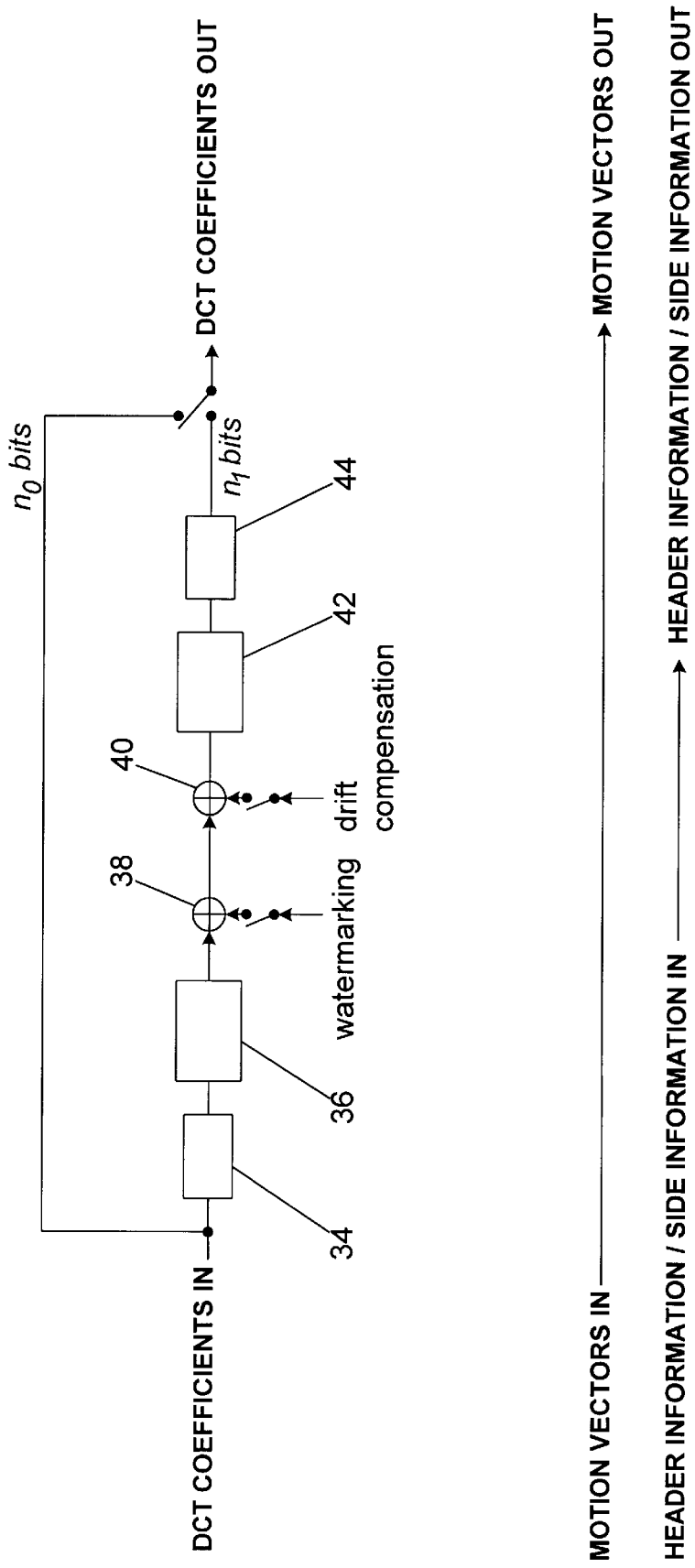
FIG. 2 is a schematic overview of a digital watermarking apparatus according to the present invention.

An overview of the watermarking method and apparatus of the present invention are now described in conjunction with FIG. 2. The signal input to the digital watermarking apparatus is divided into its separate components, those being the DCT coefficients for the prediction error portion of the signal (or for intraframe coded data), the motion vectors (if any), and the header/side information of the bitstream. The header/side information is simply passed through to the output of the watermarking apparatus 26. The motion vectors are used in calculating a drift compensation signal (discussed hereinafter), but are otherwise simply passed through to the output as well. The prediction error signal, however, is modified to embed a watermark. The prediction error data is the portion of the bitstream in which the watermark data is embedded because it may be altered slightly without perceptible changes in the appearance of the video images.

In the preferred embodiment, block sizes of 8×8 are used ("block" being a term of art referring to any of a plurality of specific regions into which each frame of the video sequence is divided). The prediction error data input to the digital watermarking apparatus has already been compressed using DCT coding, quantizing, and entropy coding. The entropy coding includes both variable length coding and zig-zag scanning of the quantized DCT coefficients so as to convert the 8×8 block to a 1×64 vector.

As shown in FIG. 2, the received prediction error data is input to entropy decoder 34, which decodes the variable length codes applied by entropy coder 22 of FIG. 1A. The data is then input to inverse quantizer 36, which dequantizes the data, reversing the operation of quantizer 16 of FIG. 1A. Thus, output from inverse quantizer 36 is a DCT coded representation of the prediction error in the form of a vector $V_n$ consisting of sixty-four DCT transform coefficients $V_0$, $V_1$, $V_2$, . . ., $V_{63}$. The coefficients output from inverse quantizer 36 are then watermarked at summing node 38.

Figure 2A:
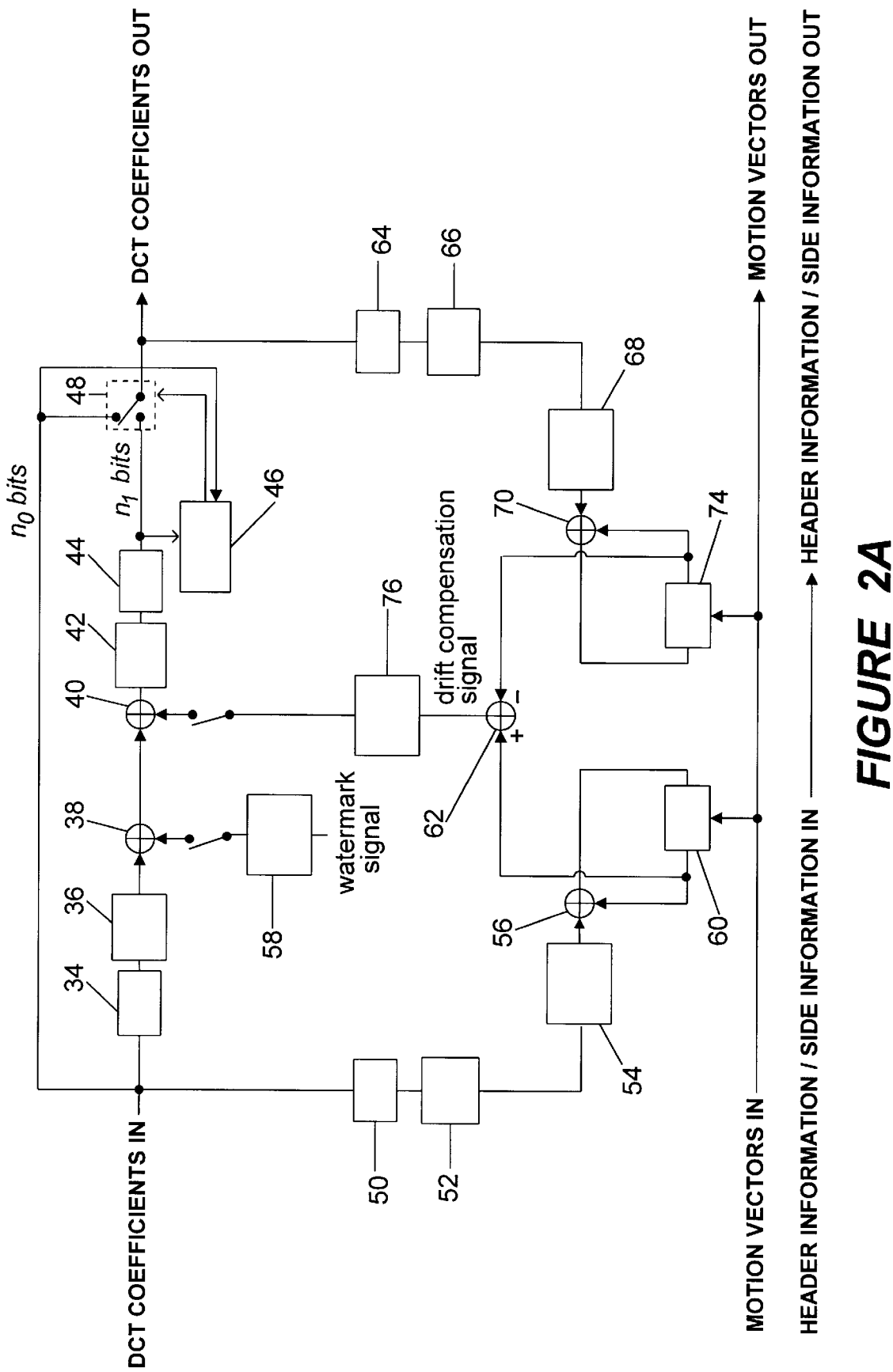
FIG. 2A is a detailed schematic illustration of the digital watermarking apparatus of FIG. 2.

Further details of the watermarking method and apparatus are now described in conjunction with FIG. 2A. The watermark signal input to summing node 38 contains information which, in the preferred embodiment, is a sequence of information bits to be hidden in the digital video bitstream. Several processing steps are used before the signal is combined with the prediction error signal. In the preferred embodiment, the sequence may be designated as:

$$a_j, a_j \in \{-1, 1\}$$

where $a_j$ are the information bits if no error correcting code is used, or the information bits coded with an error correcting code, if an error correcting code is used. Typical error correcting codes include a BCH code, a convolutional code or some other error correcting code well known in the art. This discrete signal is then spread by a large factor cr (referred to as the "chip-rate") to obtain the spread sequence:

$$b_i = a_j, j \cdot cr \leq i < (j+1) \cdot cr$$

This has the effect of spreading a bit of information over many pixels of the video, thus increasing the robustness. The spread sequence is amplified with an amplitude factor $\alpha$ and modulated with a binary pseudo-noise sequence:

$$p_j, p_j \in \{-1, 1\}$$

to arrive at the modulated signal (i.e. the watermark):

$$w_i = \alpha \cdot b_i \cdot p_i$$

Due to the noise-like nature of $p_j$, $w_i$ is also noise-like, and therefore difficult to detect, locate and manipulate for anyone who might try to remove the watermark.

In the preferred embodiment of the present invention, the DCT of the modulated watermark signal $w_i$ is calculated for each 8×8 block at DCT 58. Part of DCT 58 includes the zig-zag scanning of the 8×8 block to produce a 1×64 vector of DCT coefficients $W_n$, here $W_0$ is the DC coefficient and $W_{63}$ is the most frequent AC coefficient. The transform coded watermark signal is then added to the transform coded prediction error signal (or the transform coded image signal, for intraframe coded frames) at summing node 38. It will be understood that, for each addition of a watermark signal coefficient to a video signal coefficient, each of the two coefficients added together corresponds to the same frequency component for its respective transformed signal. Furthermore, in the preferred embodiment of the invention, the coefficients of the watermark are added to the video data coefficients only if doing so does not require a greater number of bits to encode the coefficients. In other words, the watermark is added to the signal without increasing the bit rate of the signal. This is described in more detail below.

At the summing node 38 of FIG. 2A, the prediction error signal and the watermark signal are combined. The coefficients output from the summing node 38 are then input to summing node 40, at which a drift compensation signal may be added (discussed in further detail hereinafter). The watermarked signal is then input to quantizer 42 to be requantized, and thereafter to entropy coder 44, where the desired variable length coding is employed.

In the preferred embodiment, it is desirable not to increase the bit rate of the video signal being watermarked. When such a bit rate constraint is being observed, only non-zero coefficients of the digital video signal are watermarked. If there is no bit rate constraint, the watermarking need not be limited in this manner. Also, in the preferred embodiment, before any watermarked coefficient is output from the watermarking apparatus, the number of bits of the encoded watermarked coefficient is tested against the number of bits of the same encoded coefficient prior to watermarking (plus any extra number of bits saved in previous coding operations), if there is a bit rate constraint. Implementation of this test is shown schematically in FIG. 2A as the bitstream control element 46.

Control element 46 controls selection of the output between one of two bitstreams, the original DCT coefficients input signal (i.e., unwatermarked) or the watermarked signal output from entropy coder 44. The control over the source of the output is demonstrated in the figure by selector 48 (shown as an electrical switch, the position of which is controlled by bitstream control element 46). As shown, the bitstream control element 46 receives both the watermarked and the unwatermarked bitstreams and, for each coefficient, compares the number of bits required by each to represent the entropy coded version of that coefficient. If the entropy coded unwatermarked coefficient uses a total of no bits, and the entropy coded watermarked coefficient uses a total of $n_1$ bits, the watermarked coefficient is output only if:

$$n_1 \leq n_0 + n_3$$

where $n_s$ is the number of bits which have been previously saved or "budgeted" from previous coding operations, and are presently available to be spent. Otherwise, the original unwatermarked coefficient is output in its place. This process is continued for each coefficient, adjusting $n_s$ appropriately until the end of the block is reached.

The bit rate constraint of the preferred embodiment is limiting in that it may be possible to incorporate only a few DCT coefficients of the watermark per 8×8 block. However, for watermarking of video, the chip-rate cr may be chosen to be very high. This increases the robustness while decreasing the data rate of the watermark. Furthermore, the bit rate constraint of the preferred embodiment may not exist in certain applications. In those applications, each non-zero coefficient is watermarked and output sequentially without the need for bitstream control element 46. In yet another embodiment (where no bit rate constraints exist), each of the coefficients (zero or non-zero) is watermarked.

Referring again to FIG. 2A, a means for generating a drift compensation signal is shown which may be used to compensate for "drift" introduced to the prediction error signal from addition of the watermark signal. The term "drift" is used herein to refer to the perpetuating nature of slight modifications of a prediction error signal. When the video signal is interframe coded, the image displayed when decoded by a receiver is based on regular updates (i.e., frame by frame) to the image based on the prediction error signal. When an error of any type is introduced into the prediction error bitstream, that error is incorporated into the image at the receiver and remains there indefinitely unless the affected parts of the frame are intraframe coded. Thus, the watermark signal (which slightly modifies the actual prediction error signal) causes gradual changes in the decoded output over time as the effects of the watermark accumulate. This degradation of the video signal, or "drift", can be compensated for through the use of the drift compensation signal generated in the embodiment of FIG. 2A.

The drift compensation signal generated by the present invention does not remove the watermark itself, but compensates for the effects of watermark data from previous frames. As shown in FIG. 2A, the prediction error signal is input to entropy decoder 50 and inverse quantizer 52, and then to inverse DCT 54, the output of which is the original, uncompressed prediction error signal. This signal is input to summing node 56, where it is summed with a delayed, motion compensated version of itself. The motion compensation is provided by motion compensator 60, which also receives the motion vectors which are transmitted with the prediction error data. The operation of motion compensator 60 is well known in the art, and the output of the motion compensator 60 is input to summing node 62. Again, for intraframe coding, the output of motion compensator 60 may be zero.

The processing of the input prediction error signal is paralleled by processing of the output prediction error signal. The signal output from the watermarking apparatus is input to entropy decoder 64, inverse quantizer 66 and inverse DCT 68, so as to provide an uncompressed, interframe coded signal to summing node 70. Motion compensation is then applied to the signal using motion compensator 74 in the same manner that motion compensator 60 applies motion compensation to the input signal. The motion compensated output signal is then subtracted from the motion compensated input signal at summing node 62. Thus, the drift compensation signal is the difference between the input (unwatermarked) signal and the output (watermarked) prediction signal. The drift compensation signal is then transformed using DCT 76. When desired, the drift compensation signal is applied to summing node 40 to cancel out the effects of a watermark from previous frames. That is, along with adding new watermark data to the signal, the drift compensation signal is added, and adjusts the image maintained by the decoder of the receiver to correct for the effects of the watermarking of previous frames. Meanwhile, the watermark of the present frame is preserved, although its effect may also be canceled in subsequent frames.

Recovery of the watermark applied with the present invention is relatively simple, if the precise characteristic of the pseudo-noise sequence $p_i$ used to modulate the watermark information is known. It may be used to extract the watermark data by multiplying it with the watermarked decoded video signal $v_i{}^*$. That is, $$s_j = \sum_{i=j \cdot cr}^{(j+1) \cdot cr - 1} p_i \cdot v_i{}^* = \sum_{i=j \cdot cr}^{(j+1) \cdot cr - 1} p_i \cdot v_i + \sum_{i=j \cdot cr}^{(j+1) \cdot cr - 1} p_i^2 \cdot \alpha \cdot b_i$$

where $s_j$ is the correlation sum for the j-th bit of the watermark information (or of the j-th bit of the watermark information coded with an error-correcting code, if an error-correcting code is used). Since the video signal and the pseudo-noise sequence are uncorrelated, the first term on the right hand side of this equation vanishes (assuming cr is chosen to be sufficiently large) if $$\sum_{i=j \cdot cr}^{(j+1) \cdot cr - 1} p_i = 0$$

That is, the above term closely approaches zero if the pseudo-noise sequence contains as many −1's as 1's in the interval [j·cr . . . (j+1)·cr], in which case $p_i$ and $v_i$ would be orthogonal. In practice, however, this is not the case, and a correction term $$\Delta = -\left( \sum_{i=j \cdot cr}^{(j+1) \cdot cr - 1} p_i \right) \cdot \text{mean}(v_i{}^*)$$

which accounts for the different number of −1's and 1's in the pseudo-noise sequence must be added. $s_j$ then ideally becomes:

$$s_j = \sum_{i=j \cdot cr}^{(j+1) \cdot cr - 1} p_i \cdot v_i{}^* + \Delta \approx cr \cdot \alpha \cdot a_j$$

and the recovered information bit $a_j{}^*$ is:

$$a_j{}^* = \text{sign}(s_j)$$

A condition for recovering the watermark of the present invention is that the same pseudo-noise sequence is used for recovery that was used for modulation. Thus, even if the method being used to watermark the signal is known, the information can not be recovered without knowledge of the pseudo-noise sequence. For ease of description, a binary pseudo-noise sequence has been used above. However, non-binary sequences may also be used in the manner described above and may, in fact, be favorable in terms of security. This is because, given several sequences with different watermarks, it would be easier to determine the unwatermarked pixel values if a binary pseudo-noise sequence was used. The amplitude value a may also be varied according to local properties of the image, and can be used to exploit spatial and temporal masking effects of the human visual system. For example, the amplitude of the watermark may be chosen to be higher in areas of the video frames where changes are less perceptible to a viewer of the sequence. In addition, several watermarks can be superimposed if different pseudo-noise sequences are used for modulation. This is due to the fact that different pseudo-noise sequences are typically orthogonal to one another and do not significantly interfere.

An error correcting code may also be employed to increase the robustness of the scheme. Error correcting codes are used to add redundancy bits to the information bits in this case bits of the watermark), which may be used at the decoder to correct single-bit Transmission errors. The use of error correcting code systems is well known in the art, and details regarding their operation will not be repeated here. However, FIGS. 2B and 2C show the preferred order for watermarking in the present invention when using an error correcting code. Referring to FIG. 2B, an error correcting code is first applied to the information bits of the watermark in step 61 using a method known in the art. The information bits are then spread by chip rate cr in step 63, after which the watermark is modulated in step 65 with a frequency spreading signal, such as the pseudo-random noise signal described above.

The process of retrieving the watermark is demonstrated in FIG. 2C. The video signal containing the watermark is correlated with the frequency spreading signal in step 67 (as described above). The bit decision is then made in step 69 to decide from the correlation sum whether the actual bit is a binary zero or a binary one. Finally, the decoding of the error correcting code occurs in step 71 which retrieves the original watermark bits.

Figure 3:
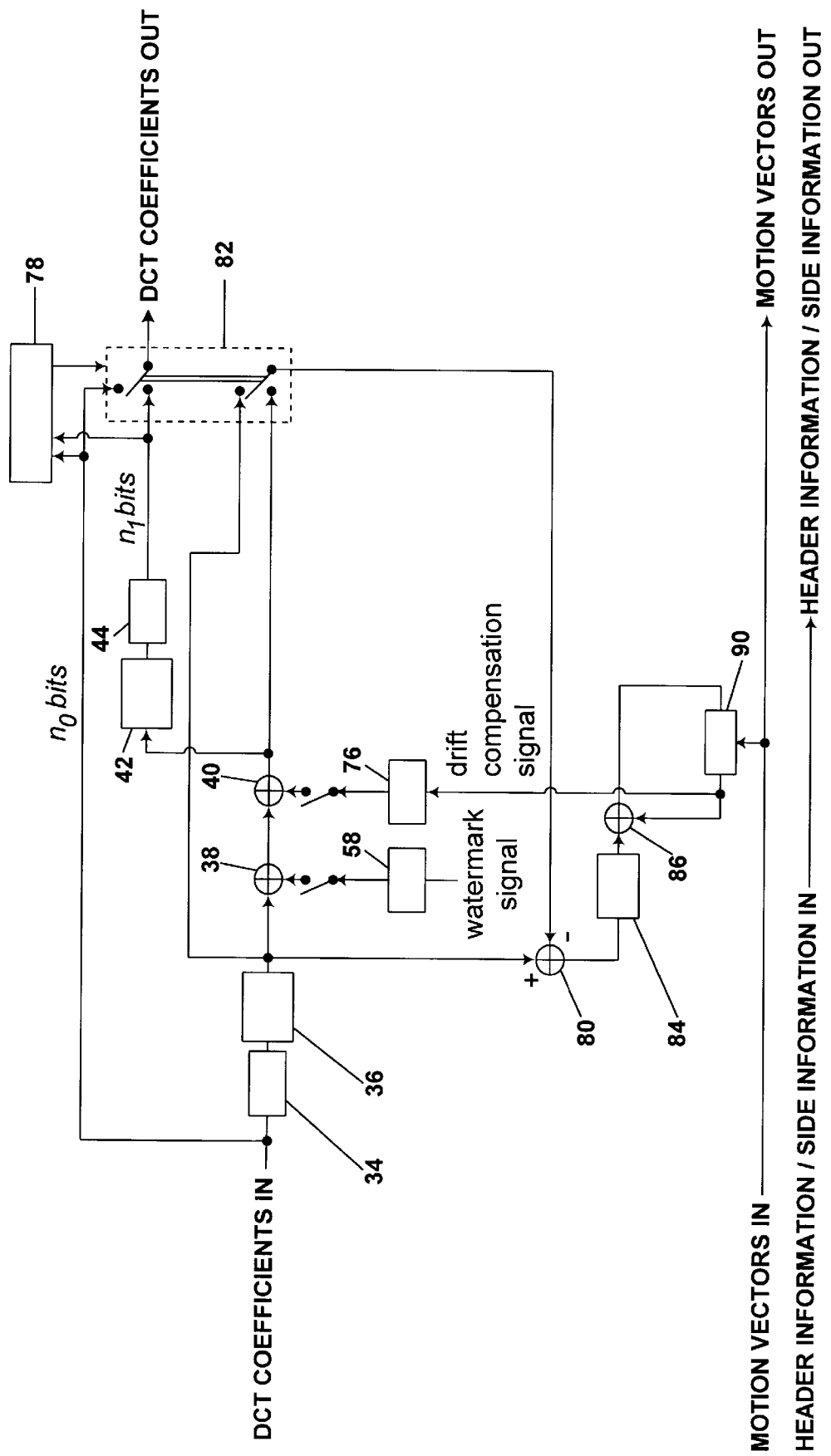
FIG. 3 is a schematic illustration of an alternative embodiment of the digital watermarking apparatus in which elements of the drift compensation signal generator are consolidated.

FIG. 3 shows an alternative embodiment of the watermarking apparatus in which the number of components for generating the drift compensation signal is reduced. By generating the difference between the input and output prediction error signals before taking the inverse DCT or applying motion compensation, many of the same components may be used for processing both the input and the output signal. As in the FIG. 2A embodiment, the prediction error signal is input to entropy decoder 34 and inverse quantizer 36. However, only after the signal is output from inverse quantizer 36 (in the form of DCT coefficients) is it input to drift compensation difference summing node 80. The DCT coefficients representative of the output signal are also input to the selector 82 along with the output from summing node 40. This allows the selector 82, which is controlled by bitstream control element 78, to select between the DCT coefficients of the watermarked signal (when the watermark is being applied) or the DCT coefficients of the unwatermarked input signal (when the watermark is not being applied). As shown, the direction of the appropriate output signal to the summing node 80 by selector is tied to the selection of the coefficient being output. Thus, when a watermarked coefficient is being output, a watermarked coefficient is also being returned to summing node 80. Similarly, when a non-watermarked coefficient is being output, a non-watermarked coefficient is returned to summing node 80.

As in the FIG. 2A embodiment, the output of the summing node 40 at which the drift compensation signal is applied is directed to quantizer 42 and entropy coder 44, such that the output signal is properly coded. However, by combining the input and output signals as DCT coefficients for the purpose of generating the drift compensation signal, a number of components shown in FIG. 2A are eliminated. Furthermore, once the inverse transform of the difference signal is found using inverse DCT 84, a single motion compensation loop (consisting of summing node 86 and motion compensator 90) may be used to apply the desired motion compensation to the drift compensation signal. That signal is then transformed using DCT 76 to produce the drift compensation signal provided at summing node 40. Also as in the FIG. 2A embodiment, the system may operate in intraframe mode, and (typically) only the non-zero DCT coefficients of the video signal are watermarked.

Figure 4:
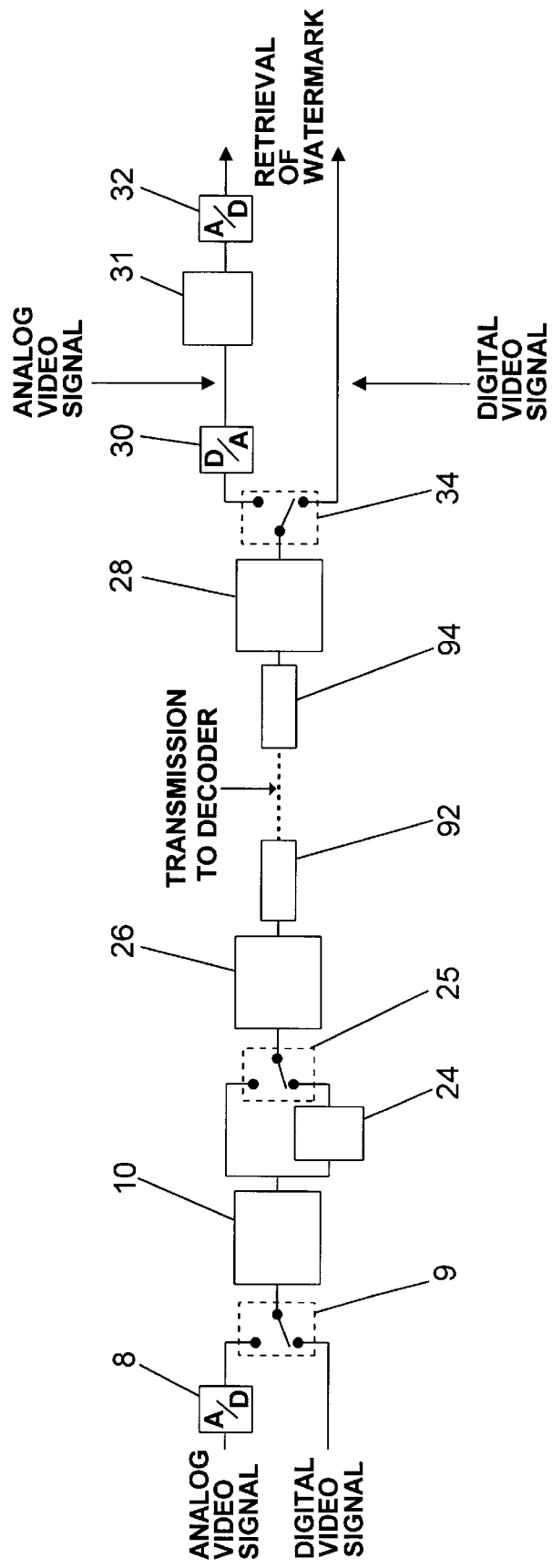
FIG. 4 is a schematic illustration of an alternative digital video transmission system in which the video signal is encrypted and watermarked prior to transmission.

In FIG. 4 is shown another alternative embodiment of the invention which is similar to the embodiment of FIG. 2A but which also includes an encryption capability. Encryption is often desirable when transmitting a signal over a non-secure transmission channel. The elements of the system shown in FIG. 4 are the same as those of FIG. 2A, except that after the watermark is applied at digital watermarking apparatus 26, the video signal is encrypted using encryption device 92. The encryption device is any one of a number of known encryption devices and may be a software, hardware, or hybrid software/hardware device.

Once the signal is encrypted, it is transmitted over the desired transmission channel in the same manner as the non-encrypted signal of the embodiment of FIG. 2A. When the signal is received, the receiver, having the appropriate encryption key, decrypts the signal with decryption device 94. Once decrypted, the coded video signal is input to interframe video decoder 28, and decoding proceeds in the manner discussed above with regard to FIG. 2A.

Figure 5:
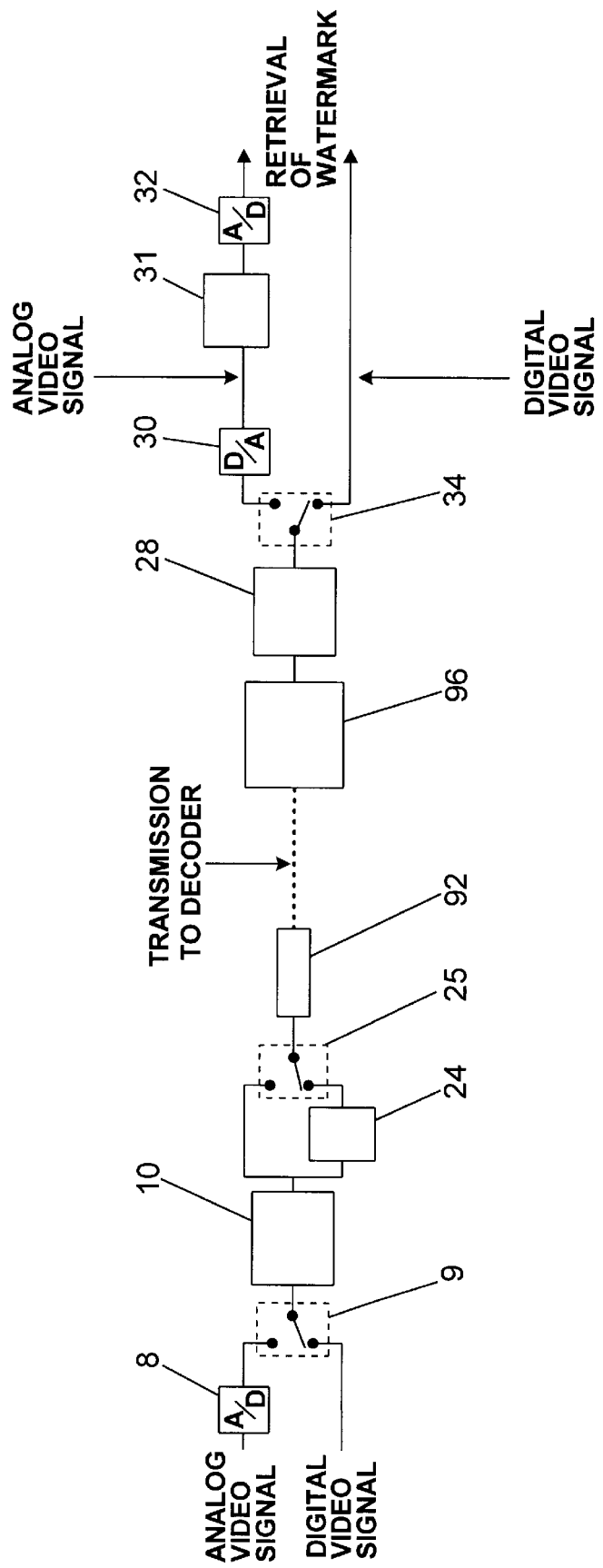
FIG. 5 is a schematic illustration of an alternative digital video transmission system in which the video signal is encrypted prior to transmission and watermarked and decrypted after transmission.

In yet another alternative embodiment, the video signal is encrypted prior to transmission, but the watermarking takes place at the receiving end of the transmission. The elements of FIG. 5 are much the same as those of FIG. 4, except that the coded video signal is encrypted with encryption device 92 and transmitted to the receiving location without the signal being watermarked. At the receiving location, a decryption and watermarking apparatus 96 decrypts the signal in the same manner as the decryption device 94 of FIG. 4, and also applies the watermark in the same manner as the digital watermarking apparatus 26 of FIGS. 2 and 4. After the signal is decrypted and watermarked, it is directed to the interframe video decoder 28, where it is decoded as in the previously mentioned embodiments.

The embodiment of FIG. 5 has commercial application in that the decryption and watermarking apparatus 96 may be supplied to the receiver by the video signal provider. This apparatus can be configured in such a way that the video signal can not be decrypted without a watermark being applied. This removes the need for a watermark being applied prior to transmission of the signal. Since the fixed bit rate constraint placed on many real-time video systems is due to the restrictions of the transmission channel, watermarking of the video signal after transmission might also remove the bit rate constraint, and correspondingly removes the need to test for an increase in the number of encoding bits using bitstream control element 46 (see FIG. 2A) or bitstream control element 78 (see FIG. 3). Such a system also simplifies the application of a different watermark for each different recipient of the signal, since each recipient has a different decryption and watermarking apparatus 96, and each apparatus can simply be configured to apply a different watermark.

While the invention has been shown and described with reference to a preferred embodiment thereof, those skilled in the art will recognize that various changes in form and detail may be made herein without departing from the spirit and scope of the invention as defined by the appended claims. For example, as mentioned previously, the watermarking method of the present invention applies to both interframe and intraframe coded data. Furthermore, most of the elements used to practice the present invention may be embodied by hardware, software or hybrid hardware/software components. All of these variations, amongst others, are considered to fall within the scope of the present invention.

What is claimed is:

1. A method of embedding a watermark in a first portion of a digital video signal bitstream containing a digital video signal that has been processed using a hybrid interframe coder to transform the digital video signal into a plurality of video transform coefficients and code the video transform coefficients to a compressed video format, wherein the watermark comprises a predetermined sequence of information bits transformed into a plurality of watermark transform coefficients, the method comprising:

decoding the compressed video format to recover the plurality of video transform coefficients;

summing the watermark transform coefficients with the video transform coefficients to generate watermarked video coefficients; and preventing drift in the first portion of the bitstream by compensating for artifacts resulting from previously added watermark transform coefficients.

2. A method according to claim 1 wherein the digital video signal is a digital video signal which has been processed using a hybrid interframe coder which is a MPEG-2 compatible coder.

3. A method according to claim 1 wherein preventing drift in the first portion of the bitstream comprises determining a difference signal indicative of the difference between a portion of the video transform coefficients before summing with the watermark transform coefficients and a corresponding portion of the watermarked video signal after summing with the watermark transform coefficients, and applying the difference signal to subsequent portions of the watermarked video coefficients.

4. A method according to claim 1 further comprising:

comparing a first number of data bits necessary to represent a first one of said video transform coefficients to a second number of data bits necessary to represent a first one of said watermarked video coefficients which corresponds to the first video transform coefficient summed with a watermark transform coefficient; and substituting the first video transform coefficient for the first watermarked video coefficient if said second number of data bits is greater than said first number of data bits.

5. A method according to claim 1 further comprising:

comparing a first number of data bits necessary to represent a first one of said video transform coefficients to a second number of data bits necessary to represent a first one of said watermarked video coefficients which corresponds to the first video transform coefficient summed with a watermark transform coefficient;

determining a reserve number of data bits, the reserve number being a difference between a total number of data bits used to represent a portion of the watermarked video coefficients already generated and a total number of data bits used to represent a portion of the video transform coefficients containing the same digital video information; and substituting the first video transform coefficient for the first watermarked video coefficient if said second number of data bits minus the reserve number of data bits is greater than said first number of data bits.

6. A method according to claim 1 further comprising encrypting the watermarked video coefficients.

7. A method according to claim 1 further comprising coding the watermarked video coefficients to a compressed watermarked video format.

8. A method according to claim 7 further comprising encrypting the compressed watermarked video coefficients.

9. A method according to claim 1 wherein summing the watermark transform coefficients with the video transform coefficients comprises summing watermark transform coefficients only with video transform coefficients which do not have a value of zero.

10. A method according to claim I wherein the compressed video format is an encrypted compressed video format and wherein the method further comprises decrypting the encrypted compressed video format prior to decoding the compressed video format.

11. A method according to claim 1 wherein the watermark comprises a sequence of bits to which an error correcting code is added before being transformed to said watermark transform coefficients.

12. A method of embedding a watermark in a first portion of a digital video signal bitstream containing a digital video signal that has been processed using a hybrid interframe coder to transform the digital video signal into a plurality of video transform coefficients and code the video transform coefficients to a compressed video format, wherein the watermark comprises a predetermined sequence of information bits transformed into a plurality of watermark transform coefficients, the method comprising:

decoding the compressed video format to recover the plurality of video transform coefficients;

summing the watermark transform coefficients with non-zero video transform coefficients to generate watermarked video coefficients;

preventing drift in the first portion of the bitstream by determining a difference signal indicative of the difference between a portion of the video transform coefficients before summing with the watermark transform coefficients and a corresponding portion of the watermarked video signal after summing with the watermark transform coefficients, and applying the difference signal to subsequent portions of the watermarked video signal; and coding the watermarked video coefficients to a compressed watermarked video format.

13. A method according to claim 12 further comprising:

comparing a first number of data bits necessary to represent a first one of said video transform coefficients to a second number of data bits necessary to represent a first one of said watermarked video coefficients which corresponds to the first video transform coefficient summed with a watermark transform coefficient; and substituting the first video transform coefficient for the first watermarked video coefficient if said second number of data bits is greater than said first number of data bits.

14. A method according to claim 12 further comprising:

comparing a first number of data bits necessary to represent a first one of said video transform coefficients to a second number of data bits necessary to represent a first one of said watermarked video coefficients which corresponds to the first video transform coefficient summed with a watermark transform coefficient;

determining a reserve number of data bits, the reserve number being a difference between a total number of data bits used to represent a portion of the watermarked video coefficients already generated and a total number of data bits used to represent a portion of the video transform coefficients containing the same digital video information; and substituting the first video transform coefficient for the first watermarked video coefficient if said second number of data bits minus the reserve number of data bits is greater than said first number of data bits.

15. Apparatus for embedding a watermark in a first portion of a digital video signal bitstream containing a digital video signal that has been processed using a hybrid interframe coder to transfer the digital video signal into a plurality of video transform coefficients and code the video transform coefficients to a compressed video format, wherein the watermark comprises a predetermined sequence of information bits transformed into a plurality of watermark transform coefficients, the apparatus comprising:

a decoder for decoding the compressed video format so as to recover the plurality of video transform coefficients;

summing apparatus for summing the watermark transform coefficients with the video transform coefficients to generate watermarked video coefficients; and a drift compensator to prevent drift in the first portion of the bitstream by compensating for artifacts resulting from previously added watermark transform coefficients.

16. Apparatus according to claim 15 wherein the digital video signal is one that was processed using a hybrid interframe coder which is a MPEG-2 compatible coder.

17. Apparatus according to claim 15 wherein the drift compensator further comprises:

means for determining a difference signal indicative of the difference between a portion of the video transform coefficients before summing with the watermark transform coefficients and a corresponding portion of the watermarked video signal after summing with the watermark transform coefficients; and a summing node for summing the difference signal with subsequent portions of the watermarked video coefficients.

18. Apparatus according to claim 15 further comprising:

means for comparing a first number of data bits necessary to represent a first one of said video transform coefficients to a second number of data bits necessary to represent a first one of said watermarked video coefficients which corresponds to the first video transform coefficient summed with a watermark transform coefficient; and output selection apparatus for substituting the first video transform coefficient for the first watermarked video coefficient if said second number of data bits is greater than said first number of data bits.

19. Apparatus according to claim 15 further comprising:

means for comparing a first number of data bits necessary to represent a first one of said video transform coefficients to a second number of data bits necessary to represent a first one of said watermarked video coefficients which corresponds to the first video transform coefficient summed with a watermark transform coefficient;

means for determining a reserve number of data bits, the reserve number being a difference between a total number of data bits used to represent a portion of the watermarked video coefficients already output and a total number of data bits used to represent a portion of the video transform coefficients containing the same digital video information; and output selection apparatus for substituting the first video transform coefficient for the first watermarked video coefficient if said second number of data bits minus the reserve number of data bits is greater than said first number of data bits.

20. Apparatus according to claim 15 further comprising encryption apparatus for encrypting the watermarked video coefficients.

21. Apparatus according to claim 15 further comprising a coding apparatus which codes the watermarked video coefficients to a compressed watermarked video format.

22. Apparatus according to claim 21 further comprising encryption apparatus for encrypting the compressed watermarked video coefficients.

23. Apparatus according to claim 15 wherein the summing apparatus only sums watermark transform coefficients with video transform coefficients that do not have a value of zero.

24. Apparatus according to claim 15 wherein the compressed video format is an encrypted compressed video format and wherein the apparatus further comprises decryption apparatus for decrypting the encrypted compressed video format prior to decoding the compressed video format.

25. Apparatus according to claim 15 wherein the watermark comprises a sequence of bits to which an error correcting code is added before being transformed to said watermark transform coefficients.

26. A computer program product for embedding a watermark in a first portion of a digital video signal bitstream containing a digital video signal that has been processed using a hybrid interframe coder to transform the digital video signal into a plurality of video transform coefficients and code the video transform coefficients to a compressed video format, wherein the watermark comprises a predetermined sequence of information bits transformed into a plurality of watermark transform coefficients, the program code comprising;

program code for decoding the compressed video format to recover the plurality of video transform coefficients;

program code for summing the watermark transform coefficients with the video transform coefficients to generate watermarked video coefficients; and program code for preventing drift in the first portion of the bitstream by compensating for artifacts resulting from previously added watermark transform coefficients.

27. A computer program product according to claim 26 wherein the digital video signal is a digital video signal which has been processed using a hybrid interframe coder which is a MPEG-2 compatible coder.

28. A computer program product according to claim 26 wherein the program code for preventing drift in the first portion of the bitstream comprises program code for determining a difference signal indicative of the difference between a portion of the video transform coefficients before summing with the watermark transform coefficients and a corresponding portion of the watermarked video signal after summing with the watermark transform coefficients, and applying the difference signal to subsequent portions of the watermarked video coefficients.

29. A computer program product according to claim 26 further comprising:

program code for comparing a first number of data bits necessary to represent a first one of said video transform coefficients to a second number of data bits necessary to represent a first one of said watermarked video coefficients which corresponds to the first video transform coefficient summed with a watermark transform coefficient; and program code for substituting the first video transform coefficient for the first watermarked video coefficient if said second number of data bits is greater than said first number of data bits.

30. A computer program product according to claim 27 further comprising:

program code for comparing a first number of data bits necessary to represent a first one of said video transform coefficients to a second number of data bits necessary to represent a first one of said watermarked video coefficients which corresponds to the first video transform coefficient summed with a watermark transform coefficient;

program code for determining a reserve number of data bits, the reserve number being a difference between a total number of data bits used to represent a portion of the watermarked video coefficients already output and a total number of data bits used to represent a portion of the video transform coefficients containing the same digital video information; and program code for substituting the first video transform coefficient for the first watermarked video coefficient if said second number of data bits minus the reserve number of data bits is greater than said first number of data bits.

31. A computer program product according to claim 26 further comprising program code for encrypting the watermarked video coefficients.

32. A computer program product according to claim 26 further comprising program code for coding the watermarked video coefficients to a compressed watermarked video format.

33. A computer program product according to claim 32 further comprising program code for encrypting the compressed watermarked video coefficients.

34. A computer program product according to claim 26 wherein the program code for summing the watermark transform coefficients with the video transform coefficients comprises program code for summing watermark transform coefficients only with video transform coefficients which do not have a value of zero.

35. A computer program product according to claim 26 wherein the compressed video format is an encrypted compressed video format and wherein the program code further comprises program code for decrypting the encrypted compressed video format prior to decoding the compressed video format.

36. A computer program product according to claim 26 wherein the watermark comprises a sequence of bits to which an error correcting code is added before being transformed to said watermark transform coefficients.

* * * * *